FIG.1. VISCOSITY vs. TIME

Dec. 17, 1968  F. P. DOWNING ET AL  3,417,097

ROTATIONAL MOLDING OF LARGE HOLLOW OBJECTS

Filed March 29, 1966  2 Sheets-Sheet 2

INVENTORS:
FRANK P. DOWNING
JOHN M. KOLYER
JOHN H. CHEN
BY
Robert A. Harman
ATTORNEY

United States Patent Office 3,417,097
Patented Dec. 17, 1968

3,417,097
ROTATIONAL MOLDING OF LARGE HOLLOW OBJECTS
Frank P. Downing, Succasunna, John M. Kolyer, Convent, and John H. Chen, Morristown, N.J., assignors to Allied Chemical Corporation, New York, N.Y., a corporation of New York
Filed Mar. 29, 1966, Ser. No. 538,309
6 Claims. (Cl. 264—308)

ABSTRACT OF THE DISCLOSURE

Provide a mold for large articles containing an inert atmosphere and a liquid charge of desired viscosity profile consisting of e-caprolactam, anionic polymerization catalyst and promoter. Heat to a temperature between melting point of lactam and melting point of resulting polymer and rotate at 1–20 r.p.m. until the charge is completely distributed over the inner mold surface. Continue heating the mold (150–175° C.) to obtain at least 20% crystallization of resulting polymer, then repeat process with second liquid charge to provide final hollow object with wall thickness of 10–100 mils.

---

This invention relates to rotational molding using "puddle" technique to form large hollow objects from e-caprolactam. In the process of this invention, the lactam is heated to a temperature above its melting point but below the melting point of the resulting polymer and is polymerized in known manner with a so-called anionic polymerization catalyst and in presence of a promoter compound of the types known to bring about anionic polymerization of lactams at temperatures above the lactam melting point and below the melting point of the resulting polymer. Thereby a solid object is obtained directly in the mold which can be removed from the mold without cooling thereof, whereby the mold can be reused without being reheated. Representative anionic polymerization systems are disclosed for example in U.S.P.'s 3,017,391 of Jan. 16, 1962 and 3,018,273 of Jan. 23, 1962 to Butler et al.; Allied Chemical Corporation French Patent 1,349,-953 granted Dec. 16, 1963; and ICI British Patent 924,453 published Apr. 24, 1963.

It is known to produce hollow articles from materials which are already in polymeric form and which are liquefied e.g. by suspending in a liquid plasticizer to form so-called plastisol. For forming cylindrical articles or spherical articles, centrifugal casting to distribute the liquid over the interior of the mold can be used. Rotational molding using "puddle" technique is known for production of those hollow articles having other than circular cross sections.

By "hollow" article we mean an article comprising walls which enclose its interior so that in all cross sections of the article the walls define loops which are closed or at least are convergent.

By "puddle" technique we mean that a puddle of liquid is maintained at the low point in a mold, and the mold is caused to rotate simultaneously about 2 intersecting axes whereby during each complete rotational cycle, successive portions of the interior walls of the mold pass in turn beneath the puddle of liquid. It will be appreciated that in such operations the rate of rotation must be slow enough so that the force due to gravity on the liquid in the puddle will exceed the total force thereon due to centrifugal reaction and to viscous drag, so that a puddle will remain about at the low point of the mold as the mold turns.

Rotational molding by puddle technique, as heretofore practiced, has generally involved steps of charging liquid plastisol at about mold temperature to form a puddle and rotating the mold to spread a thin layer of the liquid of the puddle over the interior walls of the mold. The mold walls are then heated enough to activate the gelling of this layer of plastisol, thus forming a layer of gelled plastic on the interior of the mold. For instance the walls are initially heated up from about 30° C. to about 100° C. or more for this step. As rotation continues a further deposit of liquid is picked up on the layer of gel and is quickly gelled by heat conducted from one thin layer to the next until the puddle is all gelled. The mold is then further heated above the fusion temperature of the plastic to consolidate the gelled coating into a fused plastic wall; then the mold is cooled to solidify the plastic so that the resulting hollow article can be taken out intact. Such operations are disclosed for example in U.S.P. 2,624,072 of Jan. 6, 1953 to Delacoste et al. and U.S.P. 2,659,107 of Nov. 17, 1953 to De Bell.

It has also been proposed to form articles such as pipes by copolymerizing caprolactam and caprylolactam using an anionic polymerization catalyst and a promoter and using puddle technique, e.g. in Belgian Patent 635,595 dated July 30, 1963 (Badische). The pipes thereby produced, having cylindrical cross section, are formed at relatively high rates of rotation such as 35–100 r.p.m.

We have now found that when the puddle technique is applied to polymerize lactam for production of large hollow articles, having other than circular cross sections, e.g. rectangular, triangular, or irregular cross sections, slow rotation about both intersecting axes is required to avoid turbulence in the puddle in the bottom of the mold, which occasions bubbles and resulting defects.

By "large" articles we mean those in which at least 2 of the 3 dimensions of the article each measures at least 10 inches. In the subject articles, the cross section defined by these 2 dimensions is non-circular.

Slow rotation, in the sense used herein, means rotation at low angular rates, not more than 20 r.p.m. (revolutions per minute).

We have found that when forming the above defined large non-circular hollow articles (at least 2 dimensions reaching 10 inches each and the cross section defined by these 2 dimensions being non-circular), the walls of the article which bound these large non-circular cross sections turn out lumpy when the wall thickness is to be as much as 100 mils (0.1 inch). The factors affecting thickness and uniformity of the wall include viscosity of the liquid in the puddle and viscosity of the liquid on the mold walls, and change thereof with time and temperature. Other important factors are surface tension of the liquid on the mold walls and adhesion of the liquid to the wall surfaces, which varies with the material of construction of these surfaces and with their degree of smoothness. One limiting parameter in these lactam casting operations, we have found, is the narrow temperature range of the mold which provides shortest molding times. In particular we find that in the subject anionic polymerization systems the optimum mold temperature reached is in the range between 150° C. and 175° C. Higher mold temperatures than 175° C. produce more rapid increase in viscosity of the liquid layer on the mold walls thus decreasing its tendency to flow, but also similarly affect the puddle; and tend to cause sticking of the article in the mold and to prolong the time needed for the polymer to convert to its crystalline form as required during our process, for reasons discussed below. Lower mold temperatures lead to unduly slow viscosity increase of the liquid on the mold walls.

We have now found that in the molding from e-caprolactam of large articles of non-circular cross section, strong walls of satisfactorily uniform thickness can be obtained by carrying out the following steps.

(1) Providing in a metallic mold a liquid charge comprising e-caprolactam, anionic catalyst for polymerization of said lactam, and promoter of said polymerization, the charge being heated to temperature in the range between 140° C. and 180° C. and being throughout the period while in the mold, under a dry, inert atmosphere; said charge being a composition which increases in viscosity in a time interval of at least one minute but not more than 4 minutes from viscosity of 10 cps. to viscosity of 100 cps. and which likewise increases in a time interval of at least 1 minute but not more than 3 minutes from a viscosity of 100 cps. to 1,000 cps. when polymerized at temperatures reaching the range of 140° C.–180° C.; and increases in a time of not over 2 minutes from viscosity of 1,000 cps. to viscosity of 10,000 cps. at temperatures which reach the range of 150° C.–180° C.;

(2) Providing a volume of the said liquid charge which forms a complete layer, upon the interior surface of the mold, having average thickness of at least 10 mils but not more than 100 mils;

(3) Closing off the mold and rotating it, while maintaining the conditions above specified, at angular rates not less than 1 revolution per minute (r.p.m.) and not more than 20 r.p.m.;

(4) Continuing such rotation of the mold until all of the charge of liquid has been distributed over the interior surface of the mold, this being accomplished within the time while the viscosity of the charge is not more than 10,000 cps.;

(5) Heating the mold in the range of 150° C.–175° C. until the polymer on the walls of the mold has crystallized to at least 20% crystallinity measured by X-ray examination, this heating time being at least a further 3 minutes and not more than a further 30 minutes beyond the times required in accordance with steps 1 and 4 above;

(6) Before or after removing the product of step 5 from the mold, providing within the hollow interior of a solid crystalline polymer layer of step 5 at least one further liquid charge comprising e-caprolactam, and catalyst and promoter for its anionic polymerization; maintaining dry inert atmosphere in the mold and maintaining temperatures, and volume of this further liquid charge within the ranges above specified for the earlier charge; and rotating the mold as specified in step 3 until said further charge has been completely distributed over the inner walls of the mold and has polymerized to viscosity of at least 10,000 cps.;

(7) Completing the solidification and crystallization to at least 20% crystallinity of the polymer layer formed from said further charge.

Preferably during at least one of the steps of depositing and polymerizing a liquid charge on the mold walls, the mold is rotated simultaneously about 2 intersecting axes, e.g. about 2 mutually perpendicular axes intersecting at the center of the mold, suitably by being held in a double rectangular frame, the outer member of which rotates about its longitudinal central axis and the inner of which rotates simultaneously about the transverse central axis of the outer frame, which axis is perpendicular to the first axis mentioned. Such apparatus is known in the art. Suitable ratios of angular rotation rates about these 2 axes are between 2:1 and 5:1. Other patterns of rotation which can be used include rotation first about one of two intersecting axes, then about the other; or alternately about 2 axes and 1 axis; etc.

The viscosities referred to herein can be determined by standard methods such as by a rotating or reciprocating viscometer, in a test sample of the liquid which is to be used. Time to reach 20% crystallinity can be adequately approximated by observing the time of "breakaway" in a test sample, i.e. time when shrinkage of the solidified opaque test polymer away from the container walls begins. The "breakaway" of polymer leaves the polymer in the form of an opaque solid shape loosely fitting in the interior of its container, e.g. as a rod reproducing the interior of a test tube and loosely fitting therein.

FIG. 2 is a plan view, FIG. 3 is a vertical section along the central longitudinal plane 3—3 of FIG. 2, and FIG. 4 is an end view.

It is important in our process that the rate of viscosity increase of the liquid charge should be rapid, so that the operations may be completed in reasonably short times; and it is also important that the rate of viscosity increase be not too rapid. The thickness of liquid coating that is picked up by the rotating wall of the mold as it passes beneath the puddle becomes greater, the greater the viscosity of the liquid in the puddle. At relatively low viscosity, from the initial caprolactam viscosity of about 10 cps. up to a viscosity of about 100 cps., the liquid flows readily enough so that on metal molds, a smooth adherent film of liquid is obtained having thickness up to about 10–20 mils. Thus if the viscosity remains not above about 100 cps. in the time required for at least one complete rotational cycle of the mold, a first smooth layer of liquid will be applied to the inner surface of the mold.

As the polymerization continues beyond the point of 100 cps. viscosity, the liquid picked up on the wall is less fluid and forms heavier layers. For example the layer picked up, on an aluminum strip withdrawn vertically from polymerizing liquid lactam upon reaching viscosity level of 1,000 cps. is about 40–50 mils thick and is of good thickness uniformity. As polymerization proceeds still thicker layers of liquid are picked up upon such aluminum strip; so thick that the liquid slowly drains to any low point and drops off. The overall result is to produce thick and thin areas in a slowly rotating hollow mold, having non-circular e.g. rectangular cross section, if a substantial puddle of liquid remains in the mold when the viscosity reaches the range of about 1000–10,000 cps., or if the liquid on the walls remains very long in that viscosity range. These considerations require that the viscosity of the polymerizing lactam should not rise too rapidly into the range from 1000 to 10,000 cps., and should pass through that range rapidly. In caprolactam/anionic catalyst/promoter systems used in our process this 1000–10,000 cps. range of polymer viscosity is traversed in about 0.5–2 minutes.

At a viscosity in the range of about 10,000–100,000 cps. the polymer will no longer flow appreciably under gravitational force. This "no flow" or "gel" viscosity is generally lower when a polyfunctional, e.g. trifunctional promoter is used as compared to monofunctional; accordingly such polyfunctional (trifunctional or higher functionality) promoters are preferred in our process.

Figure 1:
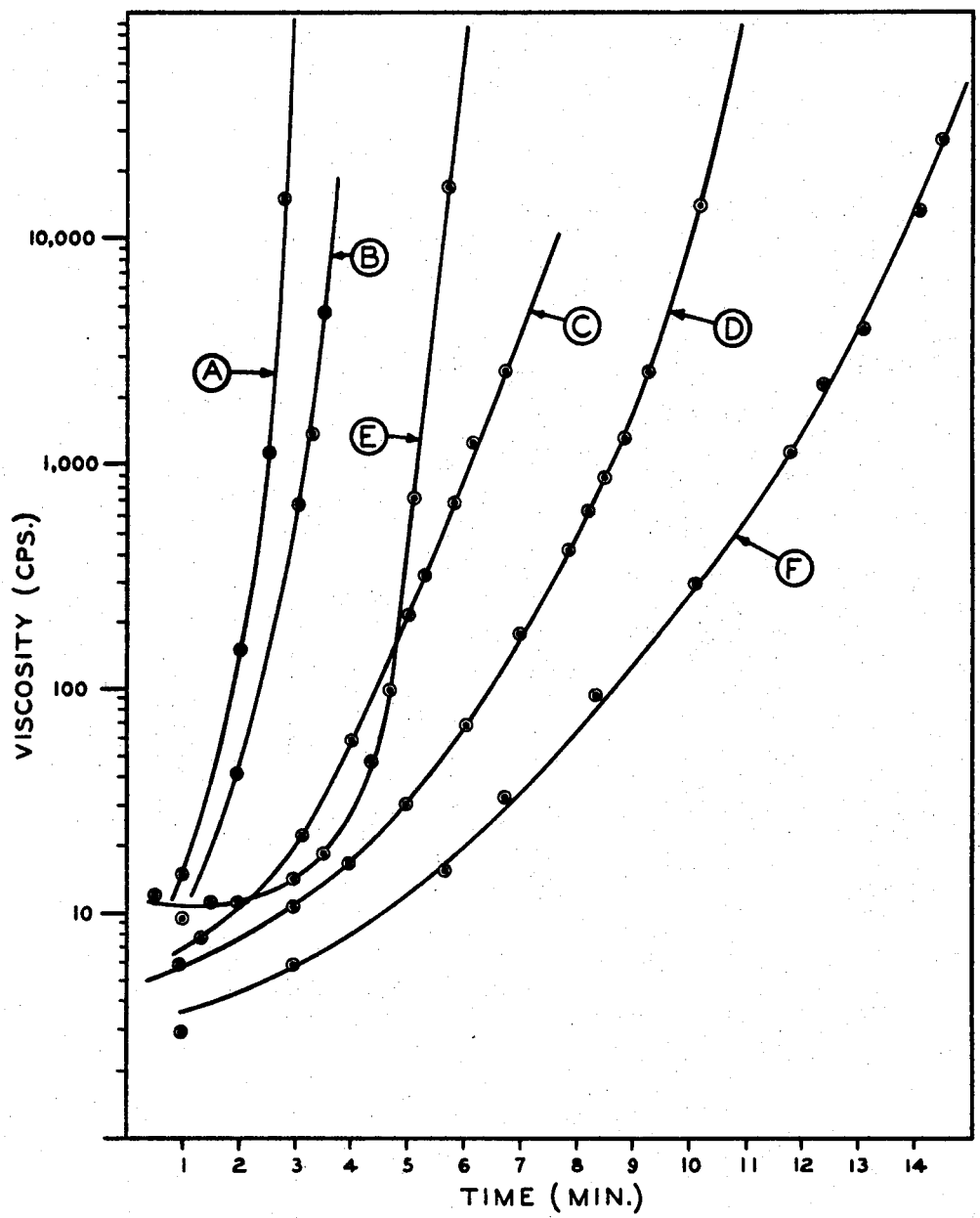
FIG. 1 is a graph of $\log_{10}$ viscosity (cps.) vs. time (minutes) for polymerization systems within and outside the above defined limitations. (F is too slow and A is too fast.)

By regulation of catalyst concentration and concentration of the promoter, the time needed to reach the specified viscosity levels in the polymer at the mold temperature can be adjusted. FIGURE 1 and Table 1 below present test data, by way of illustration of suitable catalyst/promoter concentrations and activities.

The runs shown in FIG. 1 and Table 1 below were carried out as follows.

A solution of anionic catalyst in caprolactam was prepared by stirring lithium hydride with e-caprolactam at 100°–110° C. for 1 to 2 hours, until reaction of the lithium hydride with the caprolactam was concluded as shown by cessation of hydrogen evolution. A solution of promoter in caprolactam was prepared by dissolving triphenoxy-s-triazine in molten caprolactam at about 100° C. During storage and handling the materials were blanketed with nitrogen of purified grade, passed through drying agent and molecular sieve to assure its dryness.

The lithium-caprolactam solution, the promoter solution, and any caprolactam necessary to dilute lithium and promoter to the specified concentrations were introduced, at zero time, into a 70 mm. inside diameter glass vessel by use of a hypodermic syringe, under a pure dry nitrogen atmosphere in the vessel. The total volume of each test charge was 150 ml. (except E was 200 ml.). The glass vessel was kept in a silicone oil bath maintained at 160° C.

Polymerization was allowed to proceed under dry nitrogen, and continuous viscosity readings were taken with a model RVT Brookfield viscometer using a calibrated spindle as the rotatable measuring element. Temepratures in each reaction mixture were observed from a thermocouple in a glass thermowell in the liquid, and were found to reach in 2 minutes the range of about 140° C.–145° C. and to reach at least 150° C. by the time the polymer reached 10,000 cps. viscosity. The spindle speed was 10 r.p.m. up to about 1500 cps. and was lowered as necessary to get readings on scale.

Even after the polymerizing lactam has reached a viscosity at which there is virtually no flow, however, the resulting polymer is still miscible with monomer and lower polymer, until the polymer goes over into a crystalline form. The beginning of this transition to crystalline form is signalized by appearance of cloudiness in the liquid, which thereafter develops into opacity. Finally the crystallizing polymer shrinks away from the walls of a container such as a test tube or mold, this so-called breakaway signaling crystallization to at least 20% crystallinity. The 20% or more highly crystallized polymer is insoluble in monomer and liquid polymer, so that a layer of crystallized polymer will not be reliquefied by a fresh charge of monomer. Table II below shows additional data illustrative of the above phenomena.

The data of Table II were obtained in generally the same manner as for Table I above except that no viscosity readings were taken. The total volume of the reaction mixtures used in each run of Table II was 10 ml. The time denoted by "gel" in Table II is the time when no flow was observed upon tilting the reaction vessel (test tube) at an angle of about 30° from the vertical. This gel time is at least as long as the time required to reach 10,000 cps. viscosity. The time denoted by "Cloud Start" is the time when turbidity was first observed in the test tube; the time denoted by "Cloud End" is the time when opacity had fully developed; the time denoted by "Breakaway Start" is the time when the solidified polymer was observed to begin to draw away from the wall of the test tube; and the time denoted by "Breakaway End," or "Breakaway" is the time when the shrinkage of solid polymer away from the test tube wall was complete. Each of these runs was carried out in an oil bath thermostated to the bath temperature noted in the table, and was under pure dry nitrogen.

It will be noted from Table I and Table II that certain catalyst/promoter systems, suitable for use in our process show "breakaway" times of 15 minutes or less; such systems are preferred for their speed of operation.

TABLE II(B).—2-PHENOXYBENZOTHIAZOLE AS AP NYLON PROMOTER [1]

| Weight percent of Promoter | Gel (Min.) | Cloud Start (Min.) | Breakaway (Min.) | Remarks |
|---|---|---|---|---|
| 0.50 | 8.4 | 9.0 | 14.8 | Ivory colored plug. |
| 0.60 | 8.0 | 8.4 | 12.0 | Do. |
| 0.70 | 7.0 | 8.4 | 10.7 | Do. |
| 0.80 | 7.9 | 8.5 | 13.6 | Do. |
| 1.00 | 8.0 | 8.8 | 11.4 | Do. |
| 1.99 | 13.7 | 13.8 | 17.1 | Do. |
| 4.01 | (2) | | | |

[1] 160°–165° C. bath; 0.06 weight percent LiH; promoter solution preheated 5 minutes in the bath.
[2] No gel after 20 minutes.

TABLE I

[Bath temp. 160° C. except "E" is at 170° C.]

| Curve Number | LiH (Weight Percent) | Promoter (Weight Percent) | Temperature Range | | Cloud (min.) | | Breakaway (min.) | |
|---|---|---|---|---|---|---|---|---|
| | | | 2 min.[3] | 10,000 cps.[4] | Start[5] | End[6] | Start[7] | End[7] |
| A | .12 | TPT [1] (.495) | 145 | 155 | 2.5 | 2.7 | 4.5 | 8.5 |
| B | 0.90 | TPT (.373) | 145 | 153 | 3.9 | 4.8 | 6.8 | 9.0 |
| C | .060 | TPT (.249) | 141 | 151 | 6.2 | 10.2 | 12.0 | 13.0 |
| D | .050 | TPT (.208) | 142 | 159 | 10.2 | 13.5 | 18.3 | 21.4 |
| E | .10 | DCE [2] (.963) | 139 | 170 | 15.0 | 16.0 | 21.6 | 23.0 |
| F | .040 | TPT (.166) | 135 | 160 | 13.1 | 22.6 | 26.0 | 28.7 |

[1] Triphenoxy-s-triazine.
[2] Dicaprolactam ether.
[3] Temperature measured 2 minutes after charging vessel.
[4] Temperature measured when viscosity reached 10,000 cps. (See Fig. 1.)
[5] Time when turbidity was first observed.
[6] Time when full opacity developed.
[7] Separation of solid polymer from walls.

TABLE II(A).—VARIOUS AP NYLON PROMOTERS

| Promoter | Grams Promoter | Time (minutes) | | | |
|---|---|---|---|---|---|
| | | Cloud Start | Cloud End | Breakaway Start | Breakaway End |
| Triphenoxy-s-triazine | .0250 | 10.5 | 12.1 | 13.1 | 15.1 |
| Isophthaloyl-bis-(3,5-dimethyl-pyrazolide) | .0604 | 4.2 | 6.2 | 10.4 | 12.3 |
| 2-chlorobenzoxazole | .0576 | 9.0 | 9.7 | 13.2 | 13.6 |
| 2-chlorobenzothiazole | .0637 | 13.0 | 14.2 | 17.4 | 18.2 |
| Reaction Product of 2-chlorobenzoxazole and Caprolactam; M.P. 87°–92° C. | .1733 | 3.3 | 3.5 | 4.8 | 5.3 |
| Reaction product of 2-chlorobenzothiazole and Caprolactam; M.P. 135°–139° C. | .1853 | 4.7 | 5.4 | 7.8 | 9.2 |

PROCEDURE.—5 ml. monomer added to promoter in test tube in 160° C. bath, contents mixed to dissolve the promoter, and 5 ml. monomer containing .00075 mols (.0006 g.) LiH (at about 100° C.) added at zero time.

TABLE II(C).—THIOCYANURATES AS AP NYLON PROMOTERS

| Promoter | Weight percent of Promoter | Gel (Min.) | Cloud Start (Min.) | Breakaway (Min.) |
| --- | --- | --- | --- | --- |
| Phenyl | .288 | 4.0 | 10.4 | 13.2 |
| Benzyl | .318 | 4.5 | 9.6 | 13.8 |
| Ethyl | .185 | 4.3 | 9.8 | 12.0 |
| p-Cresyl | .318 | 4.0 | 8.7 | 11.2 |
| p-t-Butylphenyl | .407 | 3.5 | 7.0 | 10.8 |
| p-Bromophenyl | .455 | 3.7 | 7.9 | 11.1 |
| p-Chlorophenyl | .362 | 3.2 | 6.3 | 7.8 |
| Cyclohexyl | .301 | 6.8 | 13.9 | 18.4 |

Conformably to the above considerations, in our process a layer of liquid on the mold walls is built up to average thickness not above 100 mils, preferably not above about 70 mils, at exhaustion of the liquid puddle; and this layer of polymer is then retained at temperature in the range 150°–175° C. for a long enough time to fully crystallize. Preferably the entire period of building up and polymerizing each charge to crystallization lasts not over 20 minutes. The resulting layer will have good uniformity of thickness. A new layer of similarly limited thickness can then be laid down without disturbing the first layer. When formed under essentially the same conditions as above outlined for the first layer this new layer will retain the smoothness and uniformity of the first layer and will bond firmly thereto to form in effect a single wall of increased thickness.

The rotational pattern used in laying down each separate crystallized layer can be the same as for an earlier layer or different e.g. to achieve reinforcement of particular areas.

The layers subsequent to the first can be formed using the earlier crystallized layers as a mold. Thus the first crystallized layer can be removed from the mold and supported only lightly to serve as a mold for containing the subsequent charges used to form the successive layers.

It will be appreciated that various modifying agents can be added to any one or more of the successive charges to form a layer containing the additive as one of the layers of the final wall of the hollow article. Another variant is to provide a reinforcing web within the mold and to form one or more of the layers or a part of one or more layers in and upon the reinforcing web. Pigments such as carbon black, reinforcing fibers such as glass fibers and mold release agents such as sodium stearate are illustrative of additives which can thus be incorporated; and glass cloth is illustrative of a reinforcing web which can be used. Heat stabilizers such as copper compounds and/or aromatic amines, etc. are further illustrative of suitable additives.

The following examples are illustrative of our invention and of the best mode contemplated by us for practicing the invention; but the invention is not to be interpreted as limited to all details of the examples. Percentages quoted in the examples are by weight on the recited mixtures.

Example 1

Part A.—For the preparation of a fourteen gallon (U.S.) gasoline tank, whose configuration was irregular but whose overall profile was contained in a space 23" long by 17½" wide by 10½" high, e-caprolactam solutions were prepared as follows:

A lithium/caprolactam solution was prepared by heating 1440 ml. of e-caprolactam at 100° C. with 0.10% of lithium hydride for 5 hours. A promoter/caprolactam solution was prepared at 100° C. from 1440 ml. of e-caprolactam and 0.42% of triphenoxy-s-triazine. These two solutions, still at 100° C., were injected via a filling spout into a sheet steel mold containing a pure, dry nitrogen atmosphere, which mold was in a 160° C. oven. The filling spout closed automatically when the injection tube was withdrawn.

The mold was rotated about the central longitudinal axis of a rectangular frame at 6 r.p.m. and about the central transverse axis of the frame at 2 r.p.m. The polymerized hollow tank was removed from the mold after 30 minutes and cut open for measurement of the wall thickness. A series of readings going around a corner is shown in Table III, Part A, below.

Part B.—Solutions of e-caprolactam containing anionic catalyst and promoter were made up as in Part A. 720 ml. portions each of the first and second e-caprolactam solutions at 100° C. were charged to the mold at a mold temperature of 160° C. The mold was rotated as in Part A, for 15 minutes. The mold was then stopped and a second charge was inserted as before through valving which assured exclusion of air from the mold interior. Mold rotation was resumed for a second 15 minute period. The molded product was then removed and sectioned to compare its wall thickness to that in Part A. See Table III, Part B, below.

TABLE III.—COMPARATIVE THICKNESSES MEASURED AROUND TANK WALLS

| Position: | Part A, mils | Part B, mils |
| --- | --- | --- |
| 1 | 140 | 166 |
| 2 | 119 | 146 |
| 3 | 188 | 148 |
| 4 | 114 | 123 |
| 5 | 106 | 113 |
| 6 | 131 | 118 |
| 7 | 98 | 144 |
| 8 | 264 | 223 |
| 9 | 125 | 143 |
| 10 | 153 | 202 |
| 11 | 43 | 80 |
| 12 | 78 | 135 |
| 13 | 70 | 130 |

The tanks thus prepared were steamed to bring the water content to about 1–2%. They were entirely filled with water and dropped from a height of eight feet to a concrete floor. The long axis of the tanks were parallel to the floor when the tanks were dropped. Tanks prepared by the process of Part A ruptured at the mold parting line, while those prepared by the process of Part B did not rupture.

Example 2

Figure 2:
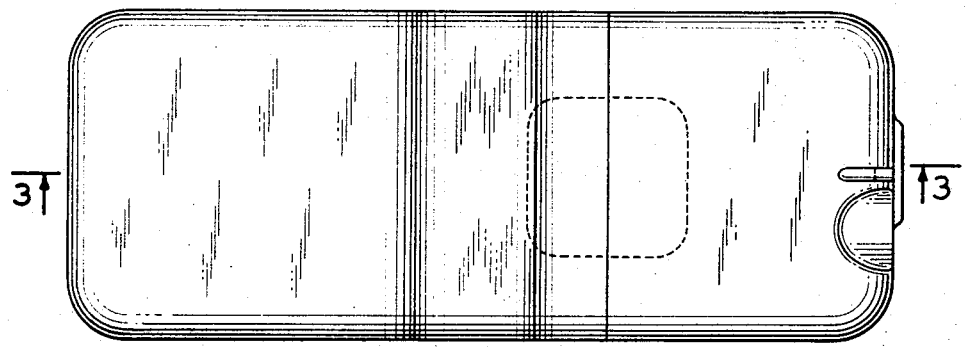
FIGS. 2, 3 and 4 illustrate an article produced (A) by use of this invention; (B) by similar operations but from a single charge of reactants.
Figure 3:
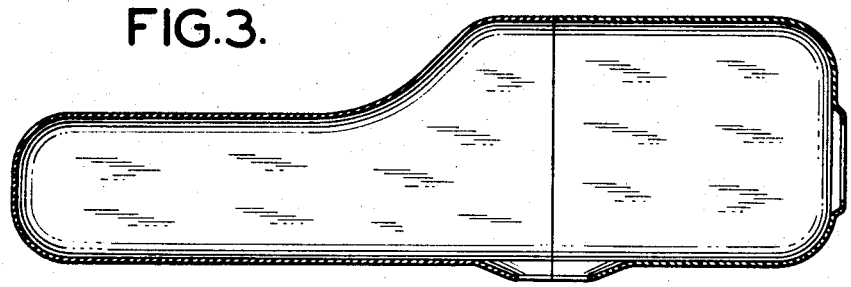
Figure 4:
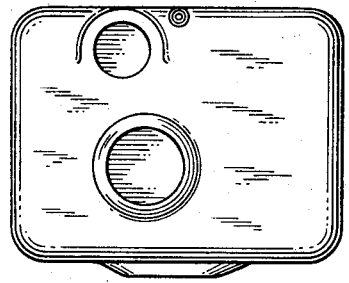

Tanks were molded having the form illustrated in FIGS. 2, 3 and 4. The overall length of the tanks was about 30 inches; the larger end was roughly 14" x 15" x 12"; and the smaller end was roughly 6" x 15" x 12". The finished tanks were to contain inserts in the form of cylindrical collars to provide openings for filling the tanks and for withdrawing the liquid contents; these collars were inserted into openings in the mold with a snug fit. For purposes of our process a spout was provided snugly fitting one of the collars and extending through far enough to clear the liquid puddle maintained within the mold during the molding process. The spout was used in cooperation with automatic valves to charge the mold with measured quantities of the catalyst solution and the promoter solution, and then to close off the mold. Thus the pure dry nitrogen, with which the molds were initially purged, was maintained in the mold and air was excluded throughout the process including the subsequent charging periods after the first.

A tank illustrated in FIGS. 2, 3 and 4, made in accordance with our process, and a comparison tank, were cut longitudinally in half as illustrated by FIG. 4; and thickness measurements were made with a micrometer at intervals of 2 inches all the way around the edge of the longitudinal section illustrated in FIG. 4. The results of the measurements are tabulated in Table IV A and B below.

The comparison tank, designated tank A, was formed using a single charge of e-caprolactam, anionic catalyst of caprolactam polymerization, and polymerization promoter; whereas tank B made in accordance with our process was formed using two equal size charges in sequence. As will be seen from Table IV A and B, the measured thickness of the tank formed from one charge of lactam varied from a minimum of 87 mils to a maximum of 253 mils whereas the thickness of the tank made with 2 independent charges under the conditions of our invention was a minimum of 123 mils and a maximum of 199 mils using the same total quantity of reactants.

The specific operations and conditions employed were as follows.

Tank A.—The mold was mounted for rotation about 2 mutually perpendicular axes intersecting at its center, and was charged with 8 grams of pigment grade carbon black, and 4.2 grams of sodium stearate as a mold release agent. The mold was heated to 160°–165° C. and purged with pure dry nitrogen. Then with the mold in an oven maintained at 160°–165° C., 1824 ml. of caprolactam which had been reacted with 0.10% by weight of lithium hydride under pure dry nitrogen was introduced still under pure dry nitrogen into the mold, this solution being at 77° C.; and 1824 ml. of caprolactam containing dissolved therein 1.40% by weight of 2-phenoxybenzothiazole, this solution being at about 120° C., was added under pure dry nitrogen. The filling spout was closed; and rotation of the mold in the oven was started. The mold was supported for rotation in a double rectangular frame, the outer frame rotating about its central longitudinal axis and the inner frame rotating within the outer frame, about the central axis thereof perpendicular to said first axis. The rotation was at a rate of 6 r.p.m. about said first axis and 2 r.p.m. about the second axis, and was continued for 20 minutes; after which time the mold was removed from the oven and the clamps at the parting line were opened, allowing removal of the finished tank. The flashing was trimmed and the tank was cut open for thickness measurements.

Tank B.—The operations were under the same conditions as for Tank A except that initially only half as large quantities of reactants were charged, viz. 912 ml. of lithium solution in caprolactam and 912 ml. of promoter solution in caprolactam. After 20 minutes of rotation, the rotation was interrupted while a second charge of catalyst solution and promoter solution, equal in volume to the first charge thereof, was injected through the filling spout into the interior of the mold, using the automatic valves to assure that no air entered the mold and the dry atmosphere was maintained therein. The mold rotation was then continued as before for another 20 minutes, after which the mold was removed from the oven and the tank was taken out of the mold as before.

The measurements of thickness on the two tanks gave the results shown in Tables IV—A and IV—B, below.

Example 3

This example was carried out generally as for Example 2 part B but with the differences noted below:

The promoter used was triphenoxy-s-triazine at concentration of 0.50% by weight in the caprolactam solution, or 0.25% by weight on the charge of caprolactam, lithium catalyst and promoter. The first charge amounted to about 1800 grams total of lactam, catalyst, and promoter. Rotation after the first charge had been introduced was contained for 13 minutes.

The second charge amounted to about 1600 grams; while this charge was polymerizing the mold was rotating only about the central transverse axis perpendicular to the cross section of the tank shown in FIG. 2; this rotation was continued for 13 minutes whereupon a third charge was added.

The third charge amounted to about 1800 grams; the rotation and heating of the third charge lasted 15 minutes, and the rotation was about 2 axes as for the first charge but was in the reverse sense from that for the first charge.

A series of tanks was produced in accordance with this Example 3. None had any spot in its walls thinner than 90 mils and they were only moderately bumpy on the interior surface, no more than tank B of Example 2. After steaming to bring the moisture content of the polymer up to at least about 1.5% by weight, these tanks had good impact resistance. They were free of leaks as tested by pressurizing with air at 5 p.s.i.g. under water. The metal collar fittings were firmly molded into place, in consequence of the shrinkage of the crystallized polymer which gripped the cylindrical shank of the collar where it extended into and beyond the wall of the tank.

TABLE IV(A).—SECTION THROUGH MIDDLE OF ONE-LAYER TANK THICKNESS MEASUREMENTS EVERY 2 INCHES

| Position: | Mils |
|---|---|
| 1 | 117 |
| 2 | 120 |
| 3 | 176 |
| 4 | 239 |
| 5 | 213 |
| 6 | 232 |
| 7 | 244 |
| 8 | 129 |
| 9 | 216 |
| 10 | 246 |
| 11 | 211 |
| 12 | 234 |
| 13 | 237 |
| 14 | 206 |
| 15 | 223 |
| 16 | 253 |
| 17 | 203 |
| 18 | 228 |
| 19 | 148 |
| 20 | 144 |
| 21 | 158 |
| 22 | 138 |
| 23 | 87 |
| 24 | 105 |
| 25 | 159 |
| 26 | 138 |
| 27 | 130 |
| 28 | 107 |
| 29 | 152 |
| 30 | 141 |
| 31 | 170 |
| 32 | 132 |
| 33 | 139 |
| 34 | 172 |
| 35 | 161 |
| 36 | 157 |
| 37 | 139 |

TABLE IV(B).—SECTION THROUGH MIDDLE OF TWO-LAYER TANK THICKNESS MEASUREMENTS EVERY 2 INCHES

| Position: | Mils |
|---|---|
| 1 | 135 |
| 2 | 123 |
| 3 | 177 |
| 4 | 185 |
| 5 | 162 |
| 6 | 173 |
| 7 | 161 |
| 8 | 167 |
| 9 | 170 |
| 10 | 197 |
| 11 | 199 |
| 12 | 186 |
| 13 | 181 |
| 14 | 187 |
| 15 | 182 |
| 16 | 175 |
| 17 | 132 |
| 18 | 148 |
| 19 | 145 |
| 20 | 131 |
| 21 | 146 |

| | |
|---|---|
| 22 | 160 |
| 23 | 185 |
| 24 | 151 |
| 25 | 144 |
| 26 | 125 |
| 27 | 136 |
| 28 | 137 |
| 29 | 140 |
| 30 | 132 |
| 31 | 170 |
| 32 | 131 |
| 33 | 162 |
| 34 | 159 |
| 35 | 144 |
| 36 | 127 |
| 37 | 142 |

We claim:

1. Process for molding large hollow articles which comprises the steps of:
   (1) Providing in a metallic mold a liquid charge comprising e-caprolactam, anionic catalyst for polymerization of said lactam, and promoter of said polymerization, the charge being heated to temperature in the range between 140° C. and 180° C. and being throughout the period while in the mold, under a dry, inert atmosphere; said charge being a composition which increases in viscosity in a time interval of at least one minute but not more than 4 minutes from viscosity of 10 cps. to viscosity of 100 cps. and which likewise increases in a time interval of at least 1 minute but not more than 3 minutes from a viscosity of 100 cps. to 1,000 cps. when polymerized at temperatures reaching the range of 140° C.–180° C.; and increases in a time of not over 2 minutes from viscosity of 1,000 cps. to viscosity of 10,000 cps. at temperatures which reach the range of 150° C.–180° C.;
   (2) Providing a volume of the said liquid charge which forms a complete layer, upon the interior surface of the mold, having average thickness of at least 10 mils but not more than 100 mils;
   (3) Closing off the mold and rotating it, while maintaining the conditions above specified, at angular rates not less than 1 revolution per minute (r.p.m.) and not more than 20 r.p.m.;
   (4) Continuing such rotation of the mold until all of the charge of liquid has been distributed over the interior surface of the mold, this being accomplished within the time while the viscosity of the charge is not more than 10,000 cps.;
   (5) Heating the mold in the range of 150° C.–175° C. until the polymer on the walls of the mold has crystallized to at least 20% crystallinity measured by X-ray examination, this heating time being at least a further 3 minutes and not more than a further 30 minutes beyond the times required in accordance with steps 1 and 4 above;
   (6) Providing within the hollow interior of a solid crystalline polymer layer of step 5 at least one further liquid charge comprising e-caprolactam, and catalyst and promoter for its anionic polymerization; maintaining dry inert atmosphere in the crystalline polymer layer, and maintaining temperatures and volume of this further liquid charge within the ranges above specified for the earlier charge; and rotating the crystalline polymer layer in the manner specified in step (3) until said further charge has been completely distributed over the inner walls of the crystalline polymer layer and has polymerized to viscosity of at least 10,000 cps.;
   (7) Completing the solidification and crystallization to at least 20% crystallinity of the polymer layer formed from said further charge.

2. Process of claim 1 wherein each successive crystallized layer of the polymer has thickness not above 70 mils.

3. Process of claim 1 wherein the entire period of building up and polymerizing and crystallizing a layer of polymer from each charge lasts not over 20 minutes.

4. Process of claim 3 wherein the promoter is polyfunctional.

5. Process of claim 4 wherein the promoter is a trifunctional triazine.

6. Process of claim 3 wherein a rotating step is further characterized by simultaneous rotation about 2 intersecting axes at angular rotation rates having ratios between 2:1 and 5:1 for the rate of rotation about 1 axis vs. the rate of rotation about the second axis.

References Cited

UNITED STATES PATENTS 3,275,733  9/1966  Schule _____ 264—310
3,317,646  5/1967  Dames _____ 264—308

ROBERT F. WHITE, *Primary Examiner.*

S. D. LANDSMAN, *Assistant Examiner.*

U.S. Cl. X.R.

264—85, 310